June 6, 1933.    O. WITTEL    1,912,749
MOTION PICTURE CAMERA
Filed July 30, 1932    2 Sheets-Sheet 1

Inventor:
Otto Wittel,
By
George A. Gillette Jr.
Attorneys.

June 6, 1933. O. WITTEL 1,912,749
MOTION PICTURE CAMERA
Filed July 30, 1932  2 Sheets-Sheet 2

Inventor:
Otto Wittel,
By Newton N. Penuss
George A. Gillette, Jr.
Attorneys

Patented June 6, 1933

1,912,749

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

MOTION PICTURE CAMERA

Application filed July 30, 1932. Serial No. 626,917.

The present invention relates to a motion picture camera and more particularly to control arrangement for a motion picture camera.

The use of clutch means for controlling the operation of motion picture cameras is well known. The provision in a motion picture camera of a light controlling means comprising a pair of shutter blades adapted to be rotated and adapted to be moved relatively to each other is also known. However, each of these means usually requires separate or individual operation by the camera operator and simultaneous operation of such means is either impossible or is awkward and inconvenient.

The primary object of the present invention is the provision of a motion picture camera which is stopped when the movable members of a light controlling means are relatively moved with respect to each other into a closed position.

Other objects of the invention will be suggested to those skilled in the art as the disclosure of the invention is developed hereinafter.

The above and other objects of the invention are obtained by the provision in a motion picture camera of a clutch means which is normally in an engaging position and which is adapted to stop the camera in said engaging position. The provision of a light controlling means including a pair of shutter blades which may be rotated simultaneously and which may be rotated relatively with respect to each other during their simultaneous rotation, and an actuating means including a lever for so relatively moving the shutter blades and including an arm which is adapted to engage the clutch means for its return to normal engaging position. The clutch means is brought into engaging position to stop the camera only when the actuating means for the shutter blades is moved to a position corresponding to the closed position for the shutter blades. In other words, if the blades of the shutter are moved to only a partially closed position, then the aforementioned arm will not engage the clutch means which will consequently remain in the position desired by the operator.

Reference is hereby made to the accompanying drawings in the several views of which similar reference numerals designate similar elements and in which.

Figure 1:
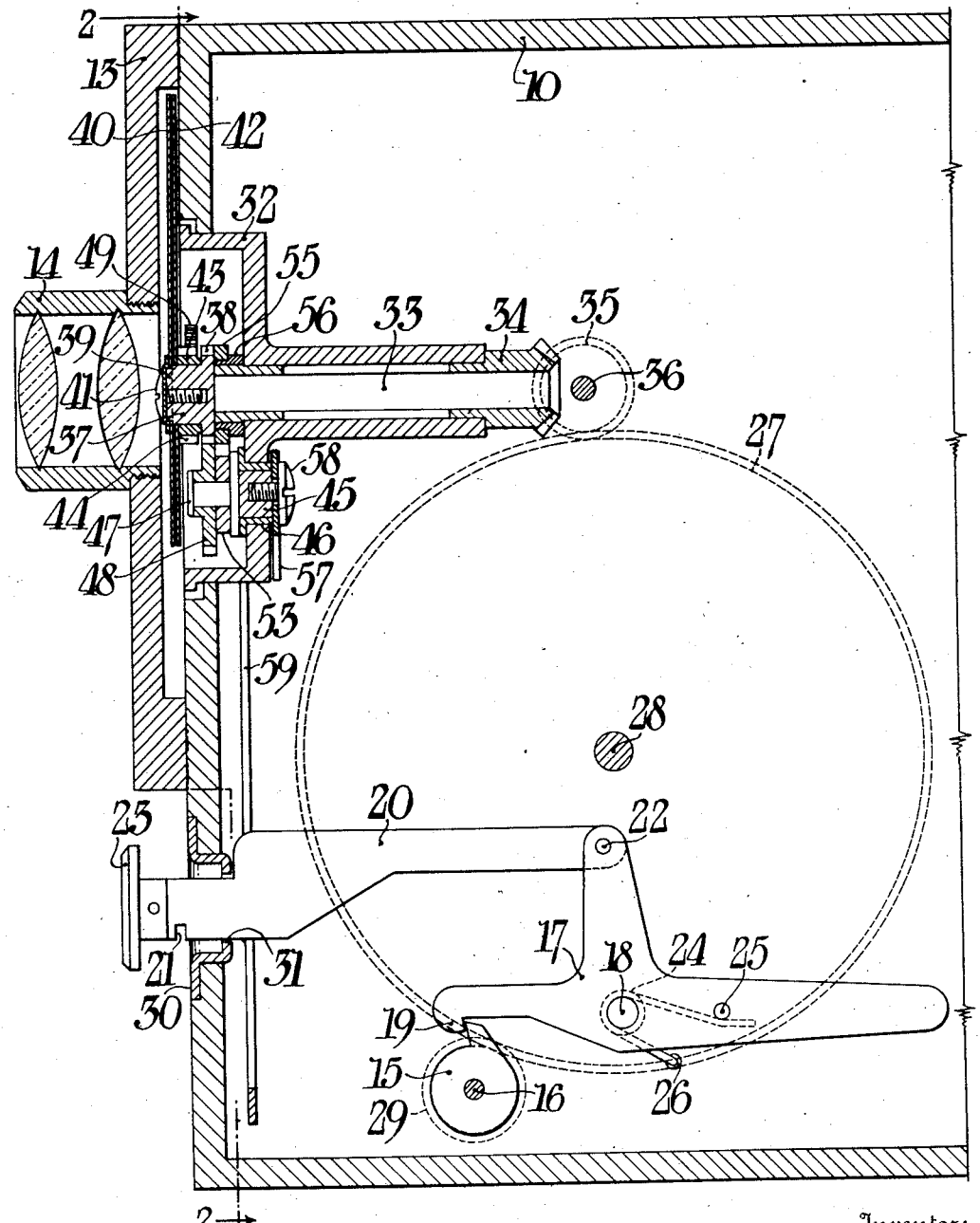
Fig. 1 is a vertical cross section through the motion picture camera according to the invention taken on a line 1—1 of Fig. 2.

In the illustrated embodiment of the invention, the motion picture camera is provided in three sections, a mechanism housing 10 which is adapted to contain the prime mover, not shown, for the camera, a film magazine 11 which abuts one side of the mechanism housing 10 and which is provided with an exposure aperture 12, and a lens mount 13 which is connected to the front of mechanism housing 10, extends across the front of film magazine 11 and supports an objective 14. The objective 14 is located in alignment with exposure aperture 12 so as to direct the image of the scene being photographed into said exposure aperture 12, the passage of the image-bearing rays to said aperture 12 being governed by a light controlling means which will be specifically described hereinafter.

The clutch means of the camera according to the invention is adapted to stop the camera when in engagement. The clutch means may comprise a single toothed gear 15 fixedly mounted upon a shaft 16 within mechanism housing 10; a pawl member 17 rotatably mounted upon shaft 18 and having a nose piece 19 adapted to engage the single toothed gear 15; and a member 20 provided with a notch 21 and having one end pivotally connected by a pin 22 to pawl member 17 and having the other end provided with a finger piece 23. The clutch means is normally held in engaging position by a coil spring 24, which encircles shaft 18 and which has one end engaging a pin 25 on pawl member 17 and the other end inserted into a hole 26 in mechanism housing 10. It will thus be clear that pawl member 17 is biased in a counter-clockwise direction viewed from Fig. 1 and is normally held in engagement with the single toothed gear 15. The prime mover for the camera, such as a spring motor, not shown, is adapted to rotate a large pinion gear 27 rotatably mounted within mechanism housing 10 by a shaft 28. A small pinion gear is fixed to shaft 16 and meshes with large pinion gear 27. Consequently, when the clutch means is in engagement, small pinion gear 29 and large pinion gear 27 are prevented from rotating and the spring motor is prevented from delivering up its energy.

A holding means is associated with the clutch means and is adapted to maintain the same in disengaged position. Such a holding means may comprise a plate member 30 provided with an elongated aperture 31 through which the notched member 20 of the clutch means may move. When member 20 has been moved to disengage pawl member 17 from single toothed gear 15, the notch 21 in member 20 will engage the lower edge of aperture 31 in plate member 30 to hold the clutch means in disengaged position against the action of coil spring 24. The member 20 may be swung upwardly by the operator to release notch 21 from plate member 30, so that coil spring 24 may return the clutch means to its normal or engaging position. The member 20 of the clutch means may also be automatically released from the holding means according to the invention and in a manner to be particularly described later.

A light-controlling means for governing the passage of image rays into exposure aperture 12 includes a pair of shutter blades which are adapted to be rotated relatively with respect to each other into various positions, one of which is a closed position, and which are adapted to be simultaneously rotated in any of the relative positions. A gear housing 32 is positioned in the front wall of mechanism housing 10 and contains an epicyclic gear train which accomplishes the movement of the shutter blades just described. A shutter shaft 33 is rotatably mounted in gear housing 32 and is rotated by the prime mover through the following gears, a miter gear 34 pinned to the end of shutter shaft 33, and a miter gear 35 mounted on shaft 36, which also carries a gear, not shown, in engagement with large pinion gear 27. A cylindrical end member 37 is fixed to the other end of shutter shaft 33, is provided around its periphery with a pinion gear 38 and has a squared portion 39 supporting a shutter blade 40. A bolt 41 is threaded into end member 37 and maintains shutter blade 40 in position on squared portion 39. The other shutter blade 42 is fixed to a sleeve 43 which turns on end member 37 and which is provided around its periphery with a pinion gear 44. Pinion gears 38 and 44 are thus connected respectively to shutter blades 40 and 42 and constitute the only gears in the epicyclic gear train which are coaxial. Independent rotation of either gear 38 or gear 44 will result in a different relative position between the shutter blades 40 and 42.

Figure 2:
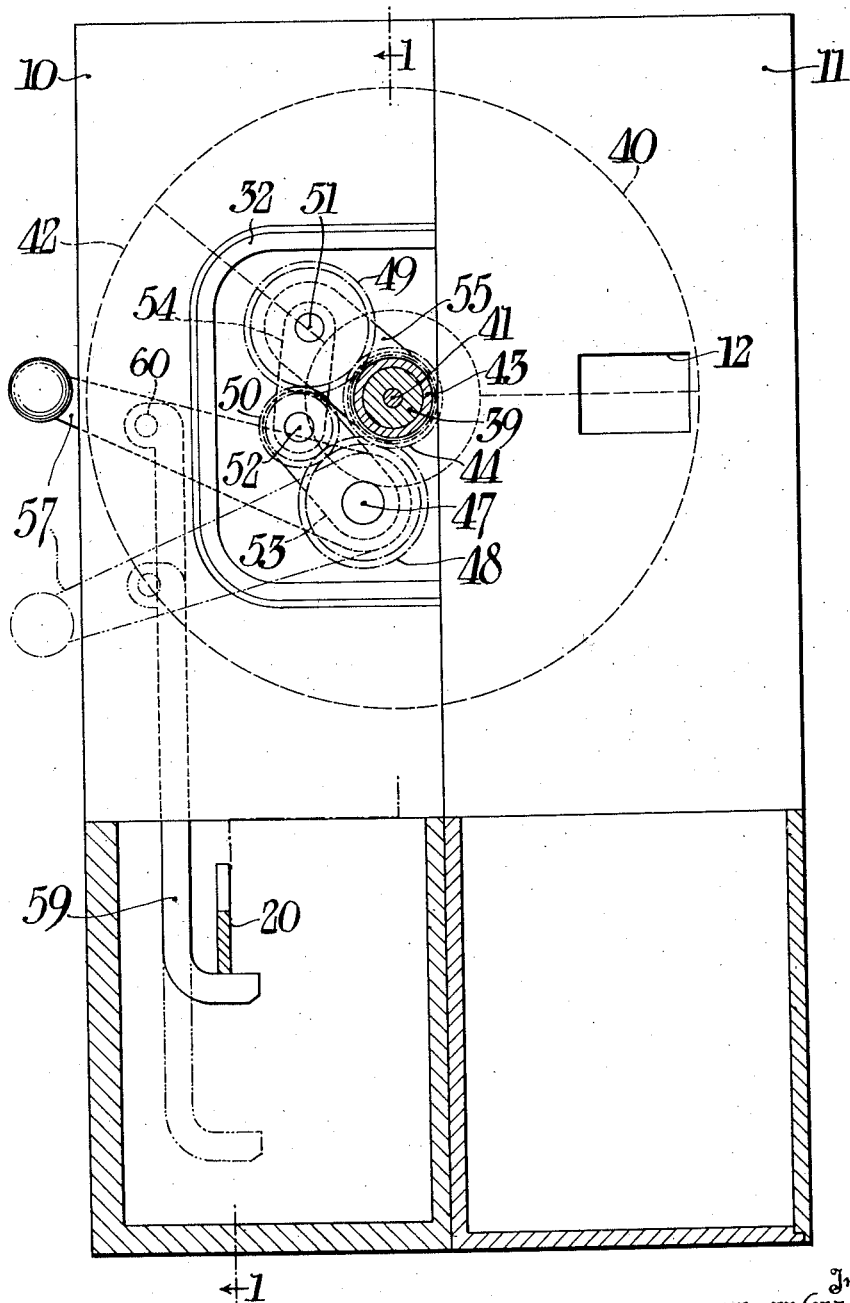
Fig. 2 is a vertical transverse section of the motion picture camera according to the invention taken on a line 2—2 of Fig. 1.

A stud 45 is rotatably mounted in a bushing 46 provided in gear housing 32. A headed stud 47 is attached to stud 45 and supports a pinion gear 48 which meshes with pinion gear 38 on end member 37. The remaining gears of the epicyclic train are a pinion gear 49 (see Fig. 2) in mesh with pinion gear 44 on sleeve 43 and a pinion gear 50 in mesh simultaneously with pinion gear 48 and and pinion gear 49. The pinion gear 49 rotates about a shaft 51 and the pinion gear 50 rotates about a shaft 52. A plurality of links support the various gears and their shafts so that the axes of rotation of the gears may be moved with respect to each other and permit relative rotary movement of gear 38 with respect to gear 44, with the consequent relative movement between shutter blade 40 and shutter blade 42. A link 53 has one end encircling headed stud 47 and the other end encircling shaft 52 of the gear 50. A link 54 has one end encircling the shaft 52 for gear 50 and the other end encircling the shaft 51 for the gear 49. A link 55 has one end encircling the shaft 51 for gear 49 and the other end encircling a sleeve 56 around the shutter shaft 33.

An actuating means for accomplishing the relative movement between the members or shutter blades of the light controlling means will now be described. Such an actuating means may be comprised of a lever 57 which is fastened to stud 45 by a bolt 58 and may also include an arm 59 pivoted to lever 57 by a pin 60 and having an L-shaped formation so that the free end of said arm 59 is adapted to engage and raise member 20 of the clutch means. It is to be understood that the actuating means may be composed of a single member which is associated with the clutch means to move the same into normal engaging position when the actuating means is moved into a position corresponding to the closed position of the light controlling means.

The operation and cooperation of the element within the motion picture camera according to the invention will now be described. The clutch means is disengaged by the operator upon the depression of finger piece 23 and movement of member 20, so that notch 21 engages the plate member 30. The clutch means is maintained in this disengaged position by the holding means and the camera operates continuously. The actuating means, preferably composed of lever 57 and arm 59, may be moved by the operator to vary the relative positions between shutter blade 40 and shutter blade 42 of the light controlling means. The arm 59 is moved to assume a position corresponding to all the relative positions of the shutter blades 40 and 42, however, the arm 59 only engages the member 20 of the clutch means to release it from the plate member 30 of the holding means when the shutter blades have been moved to closed position. The closed position of the shutter blades 40 and 42 is indicated by dotted lines in Fig. 2 and the lever 57 of the actuating means assumes the position shown, which corresponds to the closed position of the shutter blades in which the free end of arm 59 raises member 20 of the clutch means, which now becomes engaged to halt the operation of the camera. It should be noted that this automatic release of the clutch means to stop the camera is quite advantageous in that accidental or unintentional movement of film through the magazine is prevented when the shutter blades are closed. However, if, for some reason, the operator desires to leave a portion of the film in the magazine unexposed, he may continue to depress finger piece 23 and the camera will operate even when the actuating means is in a position corresponding to the closed position of the shutter blades.

Since many modifications of the present disclosure may be made without departing from the spirit of the invention, the present illustration and description are to be construed in an illustrative and not in a limited sense.

Having now particularly described my invention what I desire to secure by Letters Patent of the United States and what I claim is:

1. In a motion picture camera, the combination with a clutch means normally in engaging position and adapted in said engaging position to stop said camera, of a light controlling means including rotatable members adapted to be moved relatively during rotation into a closed position and into various open positions, and an actuating means for relatively moving said members and adapted in a position corresponding to the closed position of said members to engage said clutch means which then returns to engaging position.

2. In a motion picture camera, the combination with a clutch means normally in engaging position and adapted in said engaging position to stop said camera, of a pair of shutter blades adapted to be rotated and to be rotated relatively during rotation into a closed position and into a plurality of open positions, a lever for relatively moving said shutter blades and adapted to be moved into positions corresponding to the closed and various open positions of said shutter blades, and an arm moved by said lever and adapted to engage said clutch means in the position of said lever corresponding to the closed position of said shutter blades whereby said clutch means is returned to normal engaging position.

3. In a motion picture camera, the combination with a clutch means normally in engaging position and adapted in said engaging position to stop said camera, and a holding means adapted to maintain said clutch means in disengaged position, of a light controlling means including rotatable members adapted to be moved relatively during rotation into a closed position and into various open positions, and an actuating means for relatively moving said members and adapted in a position corresponding to the closed position of said members to release said clutch means from said holding means for return of said clutch means to engaging position.

4. In a motion picture camera, the combination with a clutch means normally in engaging position, adapted in said engaging position to stop said camera and including a member provided with a notch, and a holding means adapted to engage said notch and to maintain said clutch means in disengaged position, of a light controlling means including shutter blades adapted to be moved relatively during rotation into a closed position and into various open positions, and an actuating means for relatively moving said shutter blades and adapted in a position corresponding to the closed position of said shutter blades to disengage said holding means and the notch of said member, permitting the return of said clutch means to engaging position.

5. In a motion picture camera, the combination with a clutch means normally in engagement, adapted upon engagement to stop said camera and including a member provided with a notch, and a plate member adapted to engage said notch of the clutch means upon disengagement thereof and provided with an aperture for guiding the notched member of the clutch means, of a light controlling means including shutter blades adapted to be moved relatively during rotation into a closed position and into various open positions, and an actuating means for relatively moving said shutter blades and adapted in a position corresponding to the closed position of said shutter blades to disengage said plate member and said notched member of the clutch means, permitting the return of said clutch means to engaging position.

6. In a motion picture camera, the combination with a clutch means normally in engagement, adapted upon engagement to stop said camera and including a pivoted member provided with a notch, and a plate member upon disengagement of said clutch means and downward movement of said pivoted member to engage said notch therein, of a pair of shutter blades adapted to be rotated and to be rotated relatively during rotation into a closed position and into a plurality of open positions, a lever for relatively moving said shutter blades and movable from the positions corresponding to the open position of said shutter blades upwardly to the position corresponding to the closed position of said shutter blades, and an L-shaped arm having one end pivoted to said lever and the other end adapted to engage and raise said notched member of the clutch means out of engagement with said plate member upon upward movement of said lever into the position corresponding to the closed position of said shutter blades.

7. In a motion picture camera, the combination with a clutch means normally in engagement and adapted upon engagement to stop said camera, and a holding means adapted to maintain said clutch means in disengaged position, of a pair of shutter blades, an epicyclic gear train including a plurality of gears, two of which are each connected to one of said shutter blades, and an actuating means for changing the relative positions of the gears in said gear train to move said shutter blades into various relative positions, one of which is a closed position, and adapted in the position corresponding to the closed position of the shutter blades to release said clutch means from said holding means.

8. In a motion picture camera, the combination with a clutch means normally in engagement and adapted upon engagement to stop said camera, and a holding means adapted to maintain said clutch means in disengaged position, of an epicyclic gear train including a plurality of gears, two of which are coaxial, a pair of shutter blades each connected to each of said coaxial gears, whereby said shutter blades may be rotated, and an actuating means for changing the relative positions of the gears in the gear train, adapted to move said shutter blades into several relative positions, one of which is a closed position, and adapted in the position corresponding to the closed position of the shutter blades to release said clutch means from said holding means.

Signed at Rochester, New York, this 28th day of July, 1932.

OTTO WITTEL.

CERTIFICATE OF CORRECTION.

Patent No. 1,912,749.                                June 6, 1933.

OTTO WITTEL.

It is hereby certified that error appears in the printed specification of the above numbered patent requiring correction as follows: Page 3, line 121, claim 6, after "member" insert "adapted"; and that the said Letters Patent should be read with this correction therein that the same may conform to the record of the case in the Patent Office.

Signed and sealed this 8th day of August, A. D. 1933.

M. J. Moore.

(Seal)                                Acting Commissioner of Patents.